April 24, 1934. J. H. BROWN 1,956,460
PLANTER
Filed Sept. 11, 1931 2 Sheets-Sheet 2
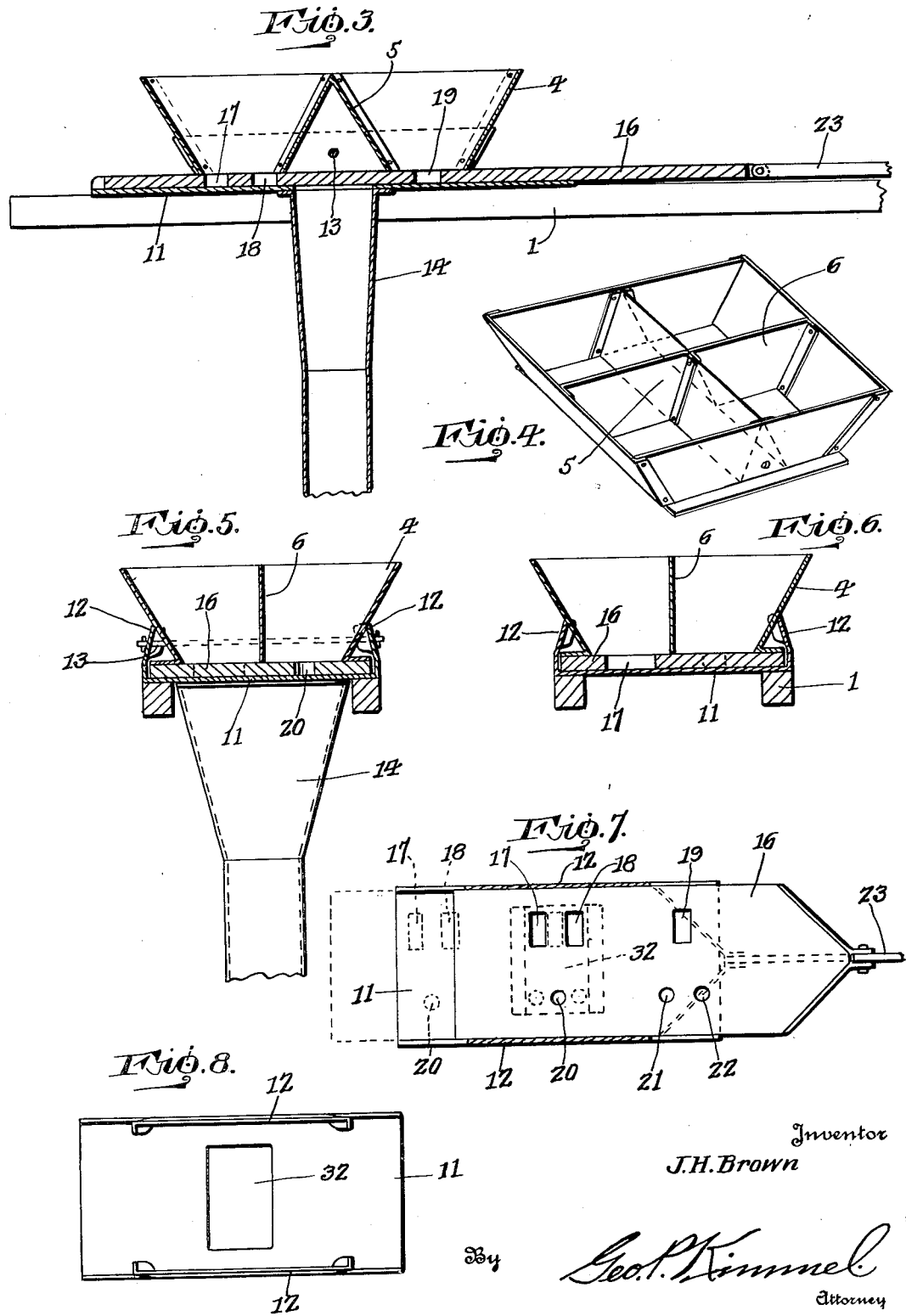

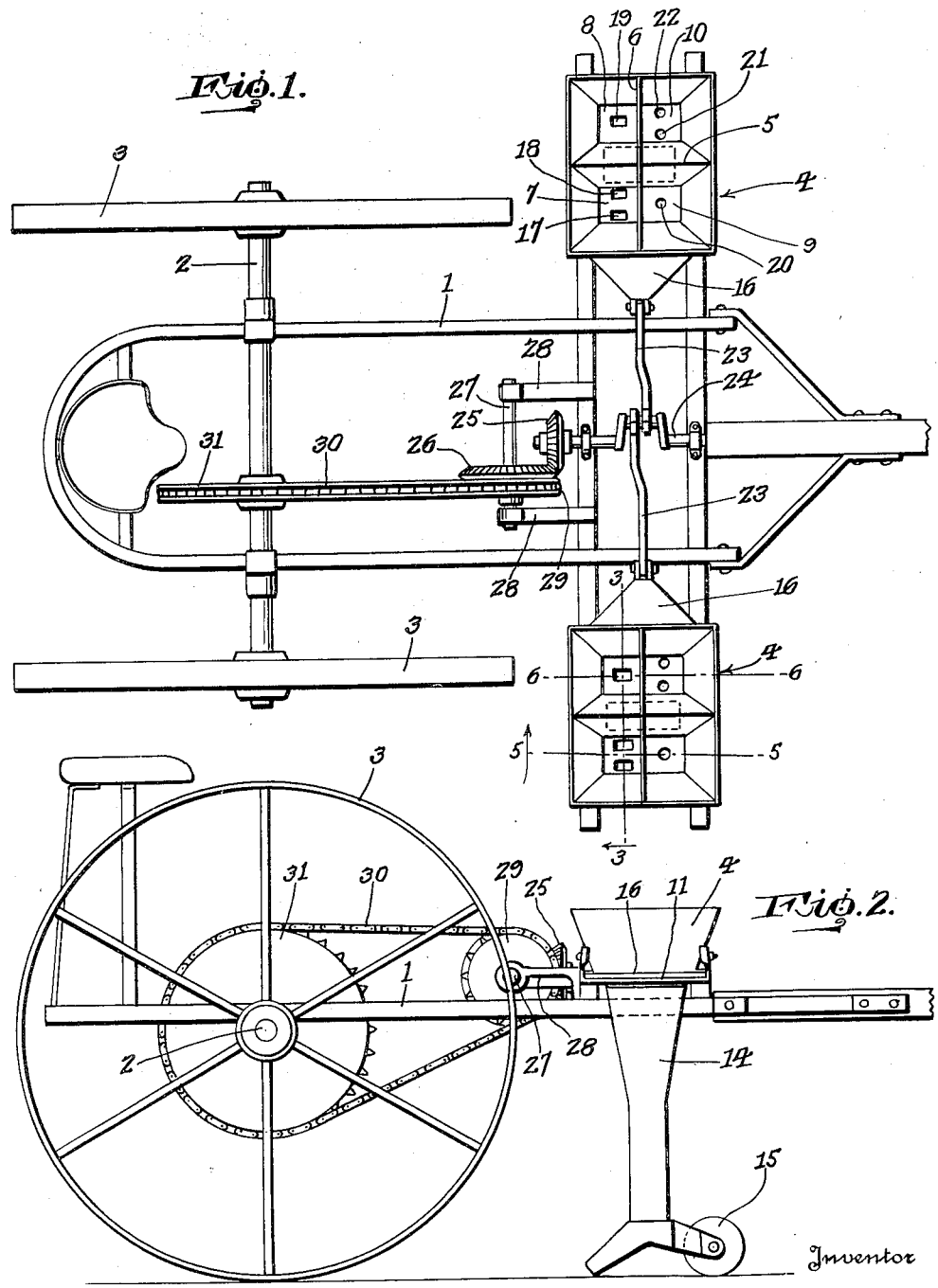

Patented Apr. 24, 1934

1,956,460

UNITED STATES PATENT OFFICE 1,956,460

PLANTER

James H. Brown, Nashville, Tenn., assignor of one-half to Tine Sawyer, Centerville, Tenn.

Application September 11, 1931, Serial No. 562,365

2 Claims. (Cl. 221—126)

This invention relates to a planter for distributing seed and fertilizer.

In planting seed with fertilizer it has been found that if the fertilizer is deposited directly with the seed, particularly corn, the fertilizer has a tendency to prevent germination, especially in cool weather. Also the fertilizer has a tendency to accelerate the growth of the corn for a few weeks, and by the time the corn has reached the silking stage, the growth promoting qualities of the fertilizer have become exhausted. However, if the fertilizer is deposited adjacent but out of contact with the seed, the growth of the corn will be normal during the first few weeks until the roots of the corn reach the fertilizer, after which the corn takes on new life at the time that it is most needed, resulting in a more bountiful yield.

Among the objects of the present invention are to provide a planter whereby seed and fertilizer may be distributed in proper relation to each other to promote to the fullest extent the proper growth of the seed; to provide a planter whereby a plural crop, such as corn and beans, may be planted simultaneously in proper relation to each other and to a fertilizer deposited therewith; and to provide the foregoing advantages in a planter which is of simple and inexpensive construction.

With the foregoing and other objects in view, the invention consists of such parts and combination of parts as set forth in the appended claims.

In the accompanying drawings in which like numerals are employed to designate like parts throughout the several views:

Figure 1 is a top plan of a planter in accordance with this invention.

Figure 2 is a side elevation thereof.

Figure 3 is an enlarged section taken at a point indicated by the line 3—3 of Figure 1.

Figure 4 is an enlarged perspective view of one of the seed and fertilizer containers.

Figure 5 is an enlarged section taken at a point indicated by the line 5—5 of Figure 1.

Figure 6 is an enlarged section taken at a point indicated by the line 6—6 of Figure 1.

Figure 7 is an enlarged plan illustrating one of the sliding plates mounted over a delivery spout.

Figure 8 is an enlarged plan of the stationary plate upon which the sliding plate and container are mounted.

Referring to the drawings in detail, the numeral 1 indicates a frame mounted on an axle 2 having a pair of ground wheels 3. Arranged in spaced relation transversely of the frame, are a pair of containers 4, each of which is provided with intersecting partitions 5 and 6 to divide the container into a four square arrangement of compartments 7, 8, 9 and 10. The partition 5 is substantially in the shape of an inverted V in cross section and the sides of the container slope downwardly and inwardly in order to give a hopper effect to each of the compartments. The compartments 7 and 8 are adapted to contain a fertilizer, while the compartments 9 and 10 are adapted to contain seed, for example corn and beans.

The containers are formed with open bottoms, and each is supported above a rigid plate 11 secured to the frame 1, the plate having a pair of oppositely disposed flanges 12 connected directly to the containers by means of a bolt 13 extending through the flanges and container beneath the partition 5. Depending from the plate 11 is a discharge spout 14, the upper end of which open through the plate 11. The outlet or lower end of the spout is directed rearwardly. A coulter 15 is attached to and arranged forwardly of its lower end.

Slidably mounted on each stationary plate 11, beneath the container 4 connected with the plate, is a sliding plate 16 provided with a plurality of openings 17, 18, 19, 20, 21 and 22. Each of the openings 17, 18 and 19 are of greater area than either of the openings 20, 21 and 22. The openings 17, 18 and 19 are arranged adjacent one side and the openings 20, 21 and 22 adjacent the other side of the longitudinal median of plate 16. Connected with the inner ends of the plate 16 are a pair of connecting rods 23 which are connected also with a crank shaft 24 having a beveled gear 25 secured to one end thereof. Meshing with the gear 25 is a gear 26 mounted on a stub shaft 27 journaled in suitable bearings 28 carried by the frame 1. Formed integrally with the gear 26 is a sprocket 29 which is operatively connected by means of a chain 30 with a sprocket 31 mounted for rotation with the axle 2.

The openings provide feed outlets. The openings are arranged in sets. Each set is positioned adjacent one side of the transverse median of plate 11 and consists of a pair of openings and a single opening spaced from the pair. One set is formed of the openings 11, 18 and 20 and the other set of the openings 19, 21 and 22. The openings 17 and 18 oppose each other and provide the pair of openings of one set. The openings 21, 22 oppose each other and provide the pair of openings of the other set. The openings 19, 20 form the single openings of the sets.

In the use of the planter, the compartments 7 and 8 are filled with fertilizer which fills the openings 17, 18 and 19 in the plates 16, and the compartments 9 and 10 are filled with seed which fills the openings 20, 21 and 22. As the planter is drawn across a field, the plates 16 are reciprocated by the mechanism operatively connecting the same with the axle 2 whereby the openings in the plates are drawn over the inlet to the spout 14 to permit the contents of the openings to fall through the spout. It is to be noted that the openings 17 and 18 are staggered with respect to the opening 20 in the direction of movement of the plates 16, while the opening 19 is staggered with respect to the openings 21 and 22 in the direction of movement of the plates 16.

In Figure 7 one of the extremes of movement of one of the plates 16 is shown in full lines, while the other extreme of the movement of the plate is shown in dotted lines. Upon movement of the plate from the full line position to the dotted line position, it will be seen that the opening 21 will be brought into registry with the inlet 32 to the spout 14, then the opening 19 will be brought into registry with the inlet, and then the opening 22 will be brought into registry with the inlet. Consequently the contents of the opening 21 first will be discharged through the spout 14, followed closely by the contents of the opening 19, which is followed closely by the contents of the opening 22. Therefore the contents of the openings 21 and 22 will be planted with the contents of the opening 19 deposited therebetween. Similarly, when the plate is moved from the dotted line position to the full line position, the opening 18 first will be brought into registry with the inlet 32, then the opening 20 will be brought into registry with the inlet, and then the opening 17 will be brought into registry with the inlet. Consequently the contents of the opening 20 will be planted with the contents of the openings 17 and 18 deposited on opposite sides thereof.

While the invention is herein illustrated and described as applied to a planter of the double row type, it is to be understood that one of the containers 4 and associated parts may be dispensed with if it is desired to apply the invention to a planter of the single row type. The embodiment of the invention herein illustrated and described represents a preferred example of the same, but it is to be understood that changes in the details of construction may be made, so long as such changes fall within the scope of the appended claims.

I claim:

1. In a hopper discharging structure for planters, an open bottom container provided with means for dividing it into a four square arrangement of hoppers, a stationary plate positioned below the bottom of the container and provided centrally thereof with an opening constituting a discharge spout inlet, a discharge spout depending from said plate and having its intake end registering with said inlet, and an oblong slidable plate mounted upon the stationary plate abutting the lower portion of the container body and said means for normally closing the open bottom of the container and provided adjacent each side of its transverse median with a set of feed outlets, said inlet being common to said sets, each set consisting of a pair of spaced aligning openings and a single opening spaced from and disposed centrally with respect to the openings of the pair, said pairs of openings disposed on opposite sides of and adjacent to the longitudinal median of the slidable plate, said single openings disposed on opposite sides of and adjacent to the longitudinal median of the slidable plate and each aligning with a pair of openings, the said sets of outlets providing for the two ends of the plate feeding alternately from opposite pairs of hoppers to said inlet.

2. In a hopper discharging structure for planters, an open bottom flared container, intersecting partitions secured within the container for dividing the latter into a four square arrangement of hoppers, one of said partitions being of inverted V-shape, a container support including a stationary plate arranged below and spaced from the open bottom of the container, a discharge spout having an inlet opening through the stationary plate, a slidable plate mounted on the stationary plate for normally closing the bottom of the container and provided with spaced sets of feed outlets, each set common to a pair of hoppers, said sets disposed with respect to the ends of said slidable plate and said hoppers whereby the two ends of the slidable plate feed alternately from opposite pairs of hoppers to the discharge spout inlet, one set consisting of a circular opening and a pair of aligning rectangular openings of greater area than the circular opening, the latter being spaced from the pair of openings, and the other set consisting of a pair of circular openings and a rectangular opening spaced from the pair of circular openings and of greater area than either of the latter, the pair of circular openings aligning with the pair of rectangular openings.

JAMES H. BROWN.